Patented Oct. 9, 1951

2,570,248

UNITED STATES PATENT OFFICE 2,570,248

METHOD OF METALIZING AND BONDING NONMETALLIC BODIES

Floyd C. Kelley, Schenectady, N. Y., assignor to General Electric Company, a corporation of New York No Drawing. Application June 30, 1948, Serial No. 36,289

6 Claims. (Cl. 29—179.5)

The present invention relates to an improved method of metalizing non-metallic refractory bodies and more particularly to an improved method of bonding such bodies either together or to a metal. This application is a continuation-in-part of my application Serial No. 648,837, filed February 19, 1946, now abandoned, and my joint application Serial No. 685,958, filed July 24, 1946, now abandoned.

Prior to the present invention it has been very difficult to join non-metallic refractory bodies and particularly ceramics together or to metallic bodies due to the fact that it has been very difficult to find a material which will satisfactorily wet both bodies. In accordance with an important aspect of my invention a mixture including titanium hydride and a solder metal, such as copper, silver, gold, or the like, is applied to the body to be metalized or bonded and the hydride dissociated by the application of heat in the presence of the solder metal. The heating is preferably done in a non-oxidizing atmosphere, such as pure dry hydrogen.

In a specific embodiment of my invention, a coating consisting of a mixture of titanium hydride, $TiH_2$ and a powdered solder, such as copper is applied to a non-metallic body which it is desired to metalize or bond to another body. The non-metallic bodies must necessarily be sufficiently refractory to withstand the temperatures involved in dissociating the hydride and melting the solder metal employed. Such materials as the glasses, ceramics, porcelain, carbon, and diamond may be metalized by the process of the present invention. With the exception of the diamond and carbon, these materials may be described as oxygen bearing refractory materials. The hydride and copper mixture may be held in suspension in alcohol or similar volatile liquid carrier or binder which is painted or sprayed on the non-metallic body. Thereafter, the coated body is heated in a medium which is inert with respect to titanium such as a vacuum or a pure dry hydrogen atmosphere to a temperature sufficient to dissociate the hydride and melt the titanium and solder. It has been found that temperatures in excess of about 400° C. are required to dissociate the hydride with reasonable speed and that temperatures in excess of this are required for melting most solders. For the copper-titanium mixture, temperatures of approximately 1000° C. are required. In the event that the metalized coating provided in accordance with the above method is rather thin, it may be advantageous to superimpose on this coating an additional layer or film of solder metal, such as silver or copper before the body is brazed or soldered to another member.

In accordance with another embodiment of the invention, refractory non-metallic parts, or such a part and a metal part, to be joined are placed in close contact with one another as in a common brazing operation. A mixture of the titanium hydride and copper powder is then placed at or adjacent the junction of the two bodies to be brazed and heat is then applied with the bodies in a pure dry hydrogen atmosphere until dissociation of the hydride and a melting of titanium and copper results. The melted metal runs between the two bodies and provides a vacuum tight joint between them. Since the titanium-copper mixture or alloy resulting from the above process tends to be viscous and hard to flow between the adjacent portions of the bodies to be joined, it may be desirable in some cases to metalize the bodies to be joined prior to the brazing or soldering operation. Thereafter, the coated bodies may be joined together or a coated body may be joined to a metallic body by any of the known brazing or soldering processes.

The invention may be employed in joining non-metallic refractory articles generally either together or to metallic articles. As one example a very good bond between diamonds and metals or metal bodies such as cemented carbides may be produced. This application of the invention is desirable in connection with the manufacture of tools, such as core drills and the like which are provided with a cutting portion consisting of diamonds embedded in the metal or cemented carbide composition.

While the present invention involves the use of titanium hydride, as a preferred metalizing or bonding material, zirconium hydride may also be used alone or in combination with the titanium hydride. The properties of the two compounds are, in general, quite similar, the metals themselves occupying adjacent positions in the periodic table.

While particular embodiments of the invention have been shown and described, it will be obvious to those skilled in the art that various changes and modifications may be made without departing from the invention in its broader aspects, and, therefore, the appended claims are intended to cover all such changes and modifications as fall within the true spirit and scope of the invention.

What I claim as new and desire to secure by Letters Patent of the United States is:

1. The method of bonding together two members, at least one of which is a non-metallic refractory member, which comprises preparing a mixture consisting essentially of titanium hydride and a solder metal, applying the mixture to the region of the refractory member or members to be bonded, placing the members with the regions to be bonded in contiguous relationship, dissociating the hydride and melting the solder metal by heating the members and coating to a temperature above 400° C.

2. The method of bonding together two members, at least one of which is a non-metallic refractory member, which comprises preparing a mixture consisting essentially of a metal hydride and a solder metal, the metal hydride being selected from the group consisting of titanium hydride, zirconium hydride, and mixtures thereof, applying the mixture to the region of the refractory member or members to be bonded, placing the members with the regions to be bonded in contiguous relationship, dissociating the hydride and melting the solder metal by heating the members and coating to a temperature above 400° C. in a medium inert with respect to the metal of hydride.

3. The method of bonding a non-metallic refractory body to another body, which comprises preparing a mixture of copper powder and titanium hydride in a binder, applying a thin coating of the mixture to the refractory body, placing the bodies with the parts to be joined in juxtaposition, dissociating the hydride and melting the copper and titanium by heating said bodies and coating to a temperature of approximately 1000° C. in an atmosphere of hydrogen.

4. The method of making a composite body including a non-metallic refractory body with a tightly adhering metal coating which comprises applying to said non-metallic refractory body in the area to be coated a layer of a metal hydride and a solder metal, the metal hydride being selected from the group consisting of titanium hydride, zirconium hydride and mixtures thereof, dissociating the hydride and melting the solder by heating the non-metallic refractory body and coating to a temperature above 400° C. in an atmosphere inert with respect to the metal of the hydride.

5. The method of making a composite body including a non-metallic refractory body with a tightly adhering metal coating which comprises applying to said non-metallic refractory body in the area to be coated a layer consisting essentially of a mixture of a metal hydride and a solder metal, the metal hydride being selected from the group consisting of titanium hydride, zirconium hydride, and mixtures thereof, dissociating the hydride and melting the solder by heating the non-metallic refractory body and coating to a temperature above 400° C. in an atmosphere inert with respect to the metal of the hydride.

6. The method of making a composite body including a non-metallic refractory body with a tightly adhering metal coating which comprises applying to said non-metallic refractory body in the area to be coated a layer consisting essentially of a mixture of powders of titanium hydride and copper, dissociating the hydride and melting the copper by heating the non-metallic refractory body and coating to a temperature of approximately 1000° C. in an atmosphere inert with respect to titanium.

FLOYD C. KELLEY.

REFERENCES CITED

The following references are of record in the file of this patent:

UNITED STATES PATENTS

| Number | Name | Date |
|---|---|---|
| 2,139,431 | Vatter | Dec. 6, 1938 |
| 2,282,106 | Underwood | May 5, 1942 |
| 2,351,798 | Alexander | June 20, 1944 |